United States Patent
Park et al.

(10) Patent No.: US 10,137,882 B2
(45) Date of Patent: Nov. 27, 2018

(54) HYBRID ELECTRIC VEHICLE AND METHOD OF CONTROLLING THE SAME

(71) Applicant: HYUNDAI MOTOR COMPANY, Seoul (KR)

(72) Inventors: Dae Ro Park, Hwaseong-si (KR); Seok Min Jeong, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 87 days.

(21) Appl. No.: 15/374,792

(22) Filed: Dec. 9, 2016

(65) Prior Publication Data
US 2018/0105159 A1 Apr. 19, 2018

(30) Foreign Application Priority Data
Oct. 19, 2016 (KR) .......................... 10-2016-0135531

(51) Int. Cl.

| | |
|---|---|
| *B60K 6/48* | (2007.10) |
| *B60L 3/00* | (2006.01) |
| *B60K 6/387* | (2007.10) |
| *B60L 11/14* | (2006.01) |
| *B60L 11/18* | (2006.01) |
| *B60L 15/20* | (2006.01) |
| *B60W 20/14* | (2016.01) |
| *B60W 30/18* | (2012.01) |

(52) U.S. Cl.
CPC ............. *B60W 20/14* (2016.01); *B60K 6/387* (2013.01); *B60K 6/48* (2013.01); *B60L 3/0023* (2013.01); *B60L 11/14* (2013.01); *B60L 11/1859* (2013.01); *B60L 11/1861* (2013.01); *B60L 15/2054* (2013.01); *B60W 30/18127* (2013.01); *B60L 2240/423* (2013.01); *B60L 2240/44* (2013.01); *B60L 2240/441* (2013.01); *B60L 2270/145* (2013.01); *B60Y 2200/92* (2013.01)

(58) Field of Classification Search
CPC ....... B60K 6/387; B60K 6/48; B60L 11/1859; B60L 11/1861; B60W 30/18127
USPC ......................................................... 701/22
See application file for complete search history.

(56) References Cited

U.S. PATENT DOCUMENTS 6,625,534 B2    9/2003  Suzuki et al.

FOREIGN PATENT DOCUMENTS

| EP | 0636818 A2 | 2/1995 |
|---|---|---|
| JP | 5-202772 A | 8/1993 |
| JP | 2000-224712 A | 8/2000 |
| JP | 2006-306325 A | 11/2006 |

(Continued)

*Primary Examiner* — Maceeh Anwari
(74) *Attorney, Agent, or Firm* — McDermott Will & Emery LLP

(57) ABSTRACT

Disclosed are a hybrid electric vehicle, which may be effectively launched when an engine clutch to connect an engine and an electric motor for driving is fixed in a lock-up state, and a method of controlling the same. A method of controlling launch of a the hybrid electric vehicle provided with an engine clutch disposed between a first motor and an engine includes determining whether or not the engine clutch is in a lock-up state, securing running of the engine, upon determining that the engine clutch is in the lock-up state, executing slip launch of the hybrid electric vehicle using power of the engine, and launching the hybrid electric vehicle using power of the first motor, if first conditions by stall of the engine are satisfied. Execution of slip launch of the hybrid electric vehicle includes charging a main battery using a second motor connected to the engine.

19 Claims, 3 Drawing Sheets

(56) References Cited

FOREIGN PATENT DOCUMENTS

| | | |
|---|---|---|
| KR | 10-0897097 B1 | 5/2009 |
| KR | 10-2013-0061575 A | 6/2013 |
| KR | 10-2014-0073305 A | 6/2014 |
| KR | 10-1405206 B1 | 6/2014 |
| KR | 10-2014-0146907 A | 12/2014 |
| KR | 10-1491374 B1 | 2/2015 |

HYBRID ELECTRIC VEHICLE AND METHOD OF CONTROLLING THE SAME

This application claims the benefit of Korean Patent Application No. 10-2016-0135531, filed on Oct. 19, 2016, which is hereby incorporated by reference as if fully set forth herein.

BACKGROUND

Technical Field

The present disclosure relates to a hybrid electric vehicle and a method of controlling the same, and more particularly, to a hybrid electric vehicle, which may be effectively launched when an engine clutch used to connect an engine and an electric motor for driving is fixed in a lock-up state, and a method of controlling the same.

Discussion of the Related Art

In general, a hybrid electric vehicle (HEV) refers to a vehicle using two kinds of power sources and the two kinds of power sources are mainly an engine (e.g., an internal combustion engine) and an electric motor. Such a hybrid electric vehicle not only has excellent fuel efficiency and power performance but also effectively reduces exhaust gas, as compared to a vehicle including only an internal combustion engine.

Such a hybrid electric vehicle may be operated in two driving modes according to kinds of operating powertrains. The two driving modes include an electric vehicle (EV) mode in which the hybrid electric vehicle is driven only using the electric motor and a hybrid electric vehicle (HEV) mode in which power is provided by operating both the electric motor and the engine. In a hybrid electric vehicle employing a parallel-type hybrid system in which an electric motor and an engine clutch (EC) are disposed between an engine and a transmission, the engine clutch is in an open state in the EV mode and is in a closed state in the HEV mode. The closed state of the engine clutch may be divided into a slip state, in which clutch plates may be allowed to slip and thus RPMs of an input terminal and an output terminal may be different, and a lock-up state in which RPMs of the input terminal and the output terminal are equal through direct connection between the clutch plates.

However, fixation of the engine clutch in the lock-up state (hereinafter, referred to as "lock-up stuck", for convenience) may occur due to mechanical failure or an error in control. In this case, in order to launch the hybrid electric vehicle in the stopped state, power of the engine may be used in the same manner as an internal combustion engine vehicle. That is, the hybrid electric vehicle may be launched while controlling so as to prevent engine stall using the slip state of the transmission (for example, a clutch slip state of the transmission or a creep torque output state of a torque converter) after running of the engine is secured.

However, since both the engine and the electric motor are rotated coaxially in the lock-up stuck state, the general hybrid electric vehicle is controlled such that, in order to prevent engine stall, the electric motor does not function as a load in rotation of the engine.

This means that a main battery may not be charged through the electric motor in the lock-up stuck state, but the main battery is discharged due to a load operated regardless of whether or not the main battery is charged through the electric motor, for example via operation of a full auto temperature controller (FATC) or a low DC-DC converter (LDC) to charge an assistant battery. The reason for this is that an assistant battery of a general internal combustion engine vehicle is chargeable through operation of an alternator but an assistant battery of a hybrid electric vehicle is chargeable only through an LDC using power of a main battery.

Consequently, when lock-up stuck occurs, launch of the hybrid electric vehicle only using power of the engine in the suppressed state of the charging operation of the electric motor causes overdischarging of the main battery.

SUMMARY

Accordingly, the present disclosure is directed to a hybrid electric vehicle and a method of controlling the same that substantially obviate one or more problems due to limitations and disadvantages of the related art.

An object of the present disclosure is to provide a hybrid electric vehicle, which may be effectively launched when lock-up stuck of an engine clutch occurs, and a method of controlling the same.

Another object of the present disclosure is to provide a hybrid electric vehicle which may prevent overdischarging of a main battery, and a method of controlling the same.

Additional advantages, objects, and features of the disclosure will be set forth in part in the description which follows and in part will become apparent to those having ordinary skill in the art upon examination of the following or may be learned from practice of the teachings disclosed herein. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling launch of a hybrid electric vehicle provided with an engine clutch disposed between a first motor and an engine, includes determining whether the engine clutch is in a lock-up state, maintaining running of the engine upon determining that the engine clutch is in the lock-up state, executing slip launch of the hybrid electric vehicle using power of the engine, and launching the hybrid electric vehicle using power of the first motor if a first condition relating to the stalling of the engine is satisfied. Execution of the slip launch of the hybrid electric vehicle can include charging a main battery using a second motor connected to the engine.

In another aspect of the present disclosure, a hybrid electric vehicle includes a first controller configured to control a first motor, a second controller configured to control an engine, a third controller configured to control an engine clutch disposed between the first motor and the engine, and a fourth controller configured to determine whether the engine clutch is in a lock-up state based on information received from the third controller. The fourth controller further maintains running of the engine through control of the second controller so as to execute a slip launch of the hybrid electric vehicle using power of the engine upon determining that the engine clutch is in the lock-up state, and controls the first controller so as to launch the hybrid electric vehicle using power of the first motor if a first condition relating to the stalling of the engine is satisfied. During the slip launch of the hybrid electric vehicle, the fourth controller controls the first controller so as to charge a main battery using a second motor connected to the engine.

It is to be understood that both of the foregoing general descriptions and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
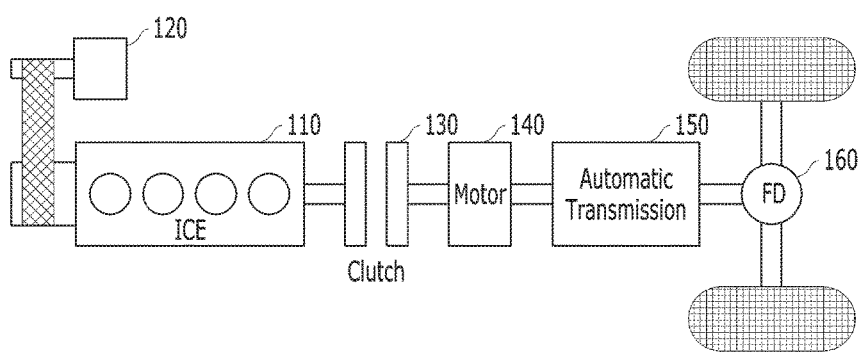
FIG. 1 is a schematic view exemplarily illustrating the structure of a powertrain of a hybrid electric vehicle in accordance with one embodiment of the present disclosure.

Reference will now be made in detail to the preferred embodiments of the present disclosure, examples of which are illustrated in the accompanying drawings. In the drawings, the same or similar elements are denoted by the same reference numerals even though they are depicted in different drawings. The suffixes "module" and "unit" used in the description below are given or used together only in consideration of ease in preparation of the specification and do not have distinctive meanings or functions.

In the following description, a detailed description of known functions and configurations incorporated herein will be omitted when it may make the subject matter of the present disclosure unclear. In addition, the accompanying drawings serve only to easily describe the embodiments disclosed in the specification but do not limit the technical spirit disclosed in the specification, and it will be understood that the embodiments include various modifications, equivalents, and substitutions, without departing from the scope and spirit of the disclosure as disclosed in the accompanying claims.

First, with reference to FIG. 1, the structure of a hybrid electric vehicle in accordance with one embodiment of the present disclosure will be described.

FIG. 1 is a schematic view exemplarily illustrating the structure of a powertrain of a hybrid electric vehicle in accordance with one embodiment of the present disclosure.

FIG. 1 illustrates a powertrain of a hybrid electric vehicle employing a parallel-type hybrid system in which an electric motor (or a driving motor) 140 and an engine clutch 130 are disposed between an internal combustion engine (ICE) 110 and an automatic transmission 150.

In general, in such a hybrid electric vehicle, if a driver presses an accelerator pedal after starting of the hybrid electric vehicle, the engine motor 140 is primarily driven using power of a main battery (not shown) in the open state of the engine clutch 130, and wheels are moved by power of the electric motor 140 via the transmission 150 and a final drive 160 (FD) (i.e., in the EV mode). When the hybrid electric vehicle is gradually accelerated, gradual increase in driving force is required and thus a starter generator motor 120 is operated to drive the engine 110.

Thereby, when rotating speeds of the engine 110 and the electric motor 140 become equal, the engine clutch 130 is closed and thus the hybrid electric vehicle is driven by both the engine 110 and the electric motor 140 (i.e., transition from the EV mode to the HEV mode). When predetermined engine stall conditions, such as deceleration of the hybrid electric vehicle, are satisfied, the engine clutch 130 is opened and the engine 110 is stopped (i.e., transition from the HEV mode to the EV mode). Here, the electric motor 140 charges the main battery using the driving force of the wheels and such a process is referred to as braking energy regeneration or regenerative braking. Additionally, the starter generator motor 120 serves as a starter motor when the engine is started, and serves as a generator during recovery of rotational energy of the engine 110 after the engine 110 is started or when the engine 110 is turned off, thus being referred to as a hybrid starter generator (HSG).

Figure 2:
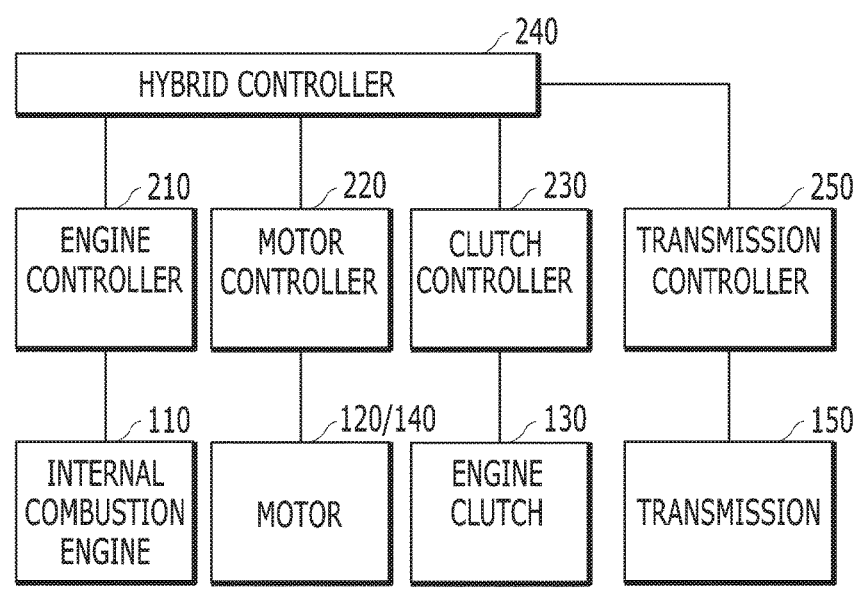
FIG. 2 is a block diagram exemplarily illustrating a control system of the hybrid electric vehicle in accordance with one embodiment of the present disclosure.

Relations between controllers or control units in a hybrid electric vehicle, to which the above-described powertrain is applied, will be shown in FIG. 2.

FIG. 2 is a block diagram exemplarily illustrating a control system of the hybrid electric vehicle in accordance with one embodiment of the present disclosure.

With reference to FIG. 2, in the hybrid electric vehicle in accordance with one embodiment of the present disclosure, an engine controller 210 may control the operation of the internal combustion engine 110, a motor controller (MCU) 220 may control the operation of the starter generator motor 120 and the electric motor 140, and a clutch controller 230 may control the operation of the engine clutch 130. Here, the engine controller 210 may be referred to as an engine management system (EMS). Further, a transmission controller 250 may control operation of the transmission 150. According to some embodiments, the starter generator motor 120 and the electric motor 140 may be separately controlled by different motor controllers.

The above-described respective controllers 210, 220, 230 and 250 may be connected to an upper-level controller, i.e., a hybrid controller 240 which executes overall control of the powertrain in the hybrid electric vehicle (hereinafter, referred to as a "hybrid controller" or "hybrid control unit (HCU)"). The respective controllers 210, 220, 230 and 250 may provide to the hybrid controller 240 with information necessary for driving mode switching, information necessary for control of the engine clutch 130 during gear shifting, and/or information necessary for control of stoppage of the engine 110. The respective controllers 210, 220, 230 and 250 may additionally or alternatively execute operation according to a control signal under the control of the hybrid controller 240.

In more detail, the hybrid controller 240 determines whether or not mode switching is executed according to the driving state of the hybrid electric vehicle. For example, the hybrid controller 240 determines an opening time of the engine clutch 130, and controls a hydraulic pressure (in the case of a wet EC) or controls torque capacity (in the case of a dry EC) when the engine clutch 130 is opened. Further, the hybrid controller 240 may determine the state (e.g., the lock-up, the slip state, the open state, or the lock-up stuck state) of the engine clutch 130 through the clutch controller 230, control the cut-off time of fuel injection of the engine 110, and determine whether or not the engine 110 stalls using information regarding the operating state of the engine 110.

Of course, it is apparent to those skilled in the art that the connection relations between the above-described controllers and the functions/divisions of the respective controllers are exemplary and the names of the respective controllers are not limited thereto. For example, any one of the controllers other than the hybrid controller 240 may provide the functions of the hybrid controller 240, or two or more of the other controllers may divisionally provide the functions of the hybrid controller 240 in the distributed manner.

Hereinafter, an effective launch method of the hybrid electric vehicle having the above-described structure in accordance with one embodiment of the present disclosure when lock-up stuck of the engine clutch occurs will be described.

In accordance with this embodiment of the present disclosure, when lock-up stuck of the engine clutch occurs, the hybrid electric vehicle primarily attempts to be launched using power of the engine while allowing charging of the battery through the electric motor and, if the predetermined engine stall conditions are satisfied, the hybrid electric vehicle switches to the EV mode and is thus launched using power of the motor.

In accordance with this embodiment, if the hybrid electric vehicle attempts to be launched using power of the engine, the transmission may be controlled in the transmission clutch slip state (or the creep torque output state according to kinds of transmissions) until the engine RPM or the engine torque reaches a designated level. On the other hand, if the hybrid electric vehicle is launched in the EV mode, the transmission clutch may be controlled in the lock-up state.

Further, in accordance with this embodiment, the predetermined engine stall conditions may mean stalling of the engine a predetermined number of times (for example, 3 times).

Further, in accordance with this embodiment, switching to the EV mode may be executed if the state of charge (SoC) of the main battery has a predetermined value or more.

Moreover, in accordance with this embodiment, if the RPM of the engine reaches the designated level, fuel injection is started and thus the engine may be started and the hybrid electric vehicle may be driven in the HEV mode (i.e., driver required torque being the sum of engine torque and motor torque).

On the other hand, in accordance with this embodiment, if the RPM of the engine does not reach the designated level and driving of the hybrid electric vehicle in the EV mode is continued, motor torque may be decreased according to the SoC of the main battery.

Figure 3:
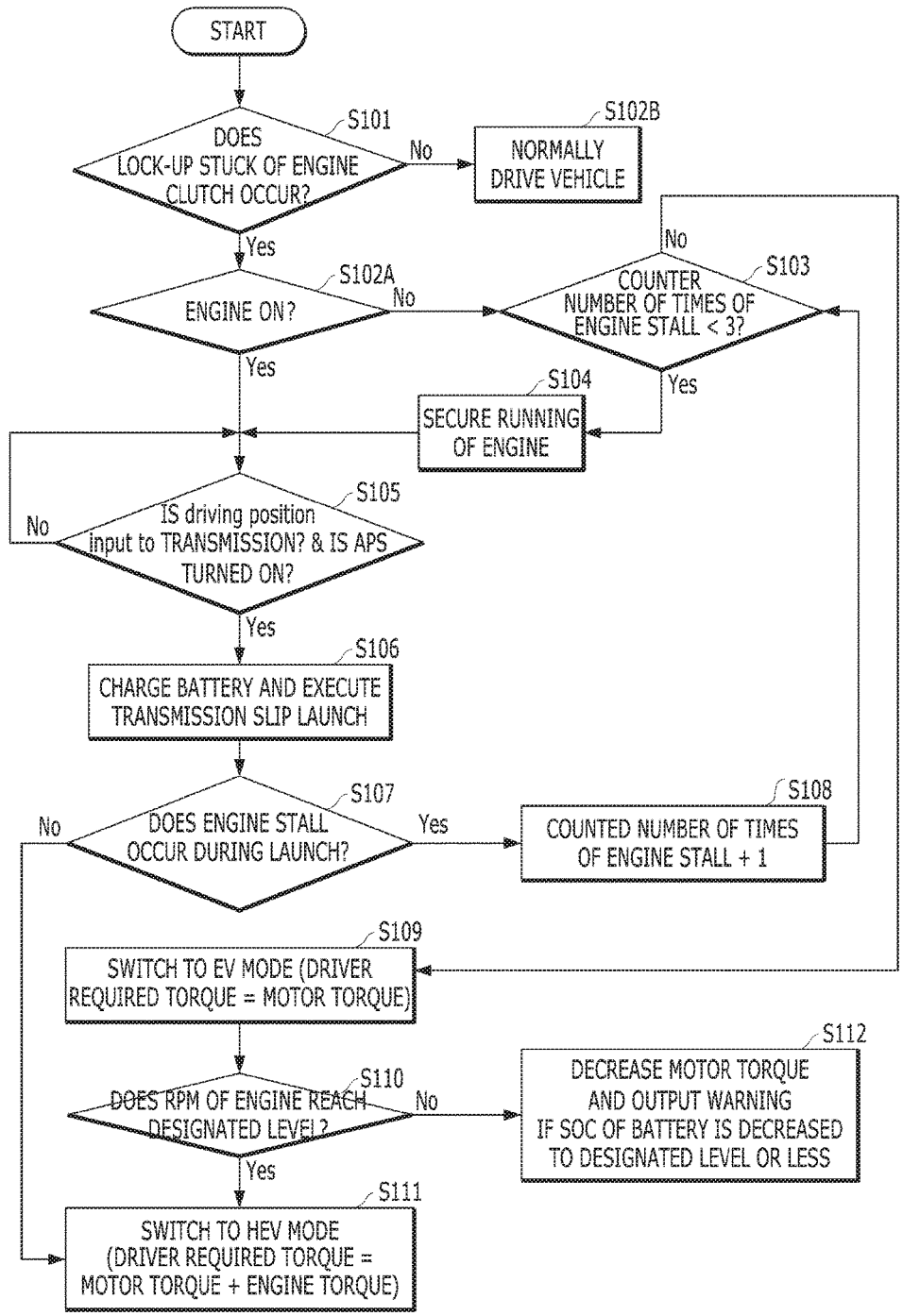
FIG. 3 is a flowchart exemplarily illustrating a process of launching a hybrid electric vehicle in accordance with one embodiment of the present disclosure, when lock-up stuck of an engine clutch occurs.

The above-described embodiment will be shown in FIG. 3.

FIG. 3 is a flowchart exemplarily illustrating a process of launching a hybrid electric vehicle in accordance with one embodiment of the present disclosure, when lock-up stuck of an engine clutch occurs. The launching of the hybrid electric vehicle may involve the launching of the vehicle from a stopped state.

With reference to FIG. 3, a hybrid controller (e.g., 240) may determine whether or not lock-up stuck of the engine clutch (e.g., 130) occurs through a signal transmitted from a clutch controller (e.g., 230) (Operation S101).

Upon determining that no lock-up stuck of the engine clutch occurs, the hybrid electric vehicle may be normally driven (Operation S102B). On the other hand, upon determining that lock-up stuck of the engine clutch occurs, the hybrid controller determines whether or not the engine is in the running state based on information received from an engine controller (e.g., 210) (Operation S102A) and, if the engine is not in the running state, checks an engine stall counter (Operation S103). Here, the engine stall counter counts the number of times the engine has stalled during attempts to launch the vehicle after occurrence of lock-up stuck and, if the counted number of times the engine has stalled does not reach a predetermined number of times (for example, 3 times), the hybrid controller secures running of the engine (i.e., maintains the running state of the engine or restarts the engine) (Operation S104).

When the driving position (for example, D) is input to the transmission and manipulation of the accelerator pedal is sensed (e.g., by an accelerator pedal sensor (APS)) under the condition that running of the engine is secured (Operation S105), transmission slip launch may be executed (Operation S106). Here, transmission slip launch may mean that, in case of a dual clutch transmission (DCT) using clutch plates, the transmission is controlled in the slip state of the clutch plates and, in case of a torque converter-type automatic transmission, the hybrid electric vehicle is launched using creep torque. This serves to prevent load caused by the transmission position from being directly transmitted to the engine. Here, charging of the main battery by a starter generator motor (e.g., 120) may be executed together according to the SoC of the main battery.

If engine stall occurs during launching (Operation S107), the hybrid controller adds 1 to the counted number of times the engine has stalled (Operation S108), and confirms again whether or not the counted number of times the engine has stalled reaches the predetermined number of times (Operation S103).

If the counted number of times of engine stall does not reach the predetermined number of times, the engine running securing procedure begins again (Operation S104) and, if the counted number of times the engine has stalled reaches the predetermined number of times, the hybrid controller switches the driving mode of the hybrid electric vehicle to the EV mode and thus launches the hybrid electric vehicle using power of the electric motor while the engine is turned off (Operation S109). Here, the motor has no possibility of stalling due to counter torque and, thus, the transmission may be controlled in the lock-up state and driver required torque may be satisfied only by power of the motor (e.g., 140).

When the RPM of the engine reaches a designated level during driving of the hybrid electric vehicle in the EV mode (Operation S110), the hybrid controller may initiate switching to the HEV mode by instructing the engine controller to start the engine (Operation S111). Here, since the RPM of the motor and the RPM of the engine are equal by lock-up stuck of the engine clutch, running of the engine may be secured only by beginning of fuel injection and fuel ignition without cranking through a starting assistant motor. Further, driver required torque in the HEV mode may be satisfied by the sum of motor torque and engine torque.

If the RPM of the engine does not reach the designated level, the hybrid electric vehicle is driven only by power of the electric motor and thus decrease in the SoC of the main battery may be accelerated. Therefore, the hybrid controller ay decrease torque of the electric motor at a designated ratio relative to the driver required torque if the SoC of the main battery is decreased to a designated level or less. Here, a warning informing the driver of a need to charge the main battery after stopping of the hybrid electric vehicle may be output through a cluster or a head unit display (Operation S112).

The various embodiments disclosed herein, including embodiments of the respective controllers 210-250 described herein, can be implemented using one or more processors coupled to a memory (or other non-transitory machine readable recording medium) storing computer-executable instructions for causing the processor(s) to perform the functions described above including the functions described in relation to the hybrid controller 240, engine controller 210, motor controller 220, clutch controller 230, and transmission controller 250. The processor(s) and memory may be mounted in the hybrid electric vehicle (HEV), and may be communicatively connected to the internal combustion engine 110, motor 120/140, engine clutch 130, and/or transmission 150 as well as to other one(s) of the controllers 210-250 so as to control operation of the vehicle and components thereof as described herein.

The above-described method in accordance with the present disclosure may be implemented as computer readable code stored in a computer readable recording medium. Computer readable recording media include all kinds of computer readable recording devices in which data readable by computers is stored. For example, the computer readable recording media include non-transitory storage media such as a Hard Disk Drive (HDD), a Solid State Drive (SSD), a Silicon Disk Drive (SDD), a ROM, a RAM, a CD-ROM, a magnetic tape, a floppy disk, an optical data storage device, etc. Further, the computer readable recording media may be realized in the form of a carrier wave (for example, transmission over the Internet).

As is apparent from the above description, a hybrid electric vehicle in accordance with at least one embodiment of the present disclosure may be effectively launched in a lock-up stuck situation of an engine clutch.

Particularly, power generation using an electric motor is not suppressed and thus overdischarging of a main battery may be prevented, and an engine is started after switching to motor launch when engine stall occurs and may thus rapidly cope with engine stall.

It will be apparent to those skilled in the art that various modifications and variations can be made in the present disclosure without departing from the spirit or scope of the invention. Thus, it is intended that the present disclosure cover the modifications and variations of this invention provided they come within the scope of the appended claims and their equivalents.

What is claimed is:

1. A method of controlling launch of a hybrid electric vehicle provided with an engine clutch disposed between a first motor and an engine, the method comprising:
   determining whether the engine clutch is in a lock-up state;
   maintaining running of the engine upon determining that the engine clutch is in the lock-up state;
   executing slip launch of the hybrid electric vehicle using power of the engine; and
   launching the hybrid electric vehicle using power of the first motor, if a first condition relating to the stalling of the engine is satisfied,
   wherein execution of the slip launch of the hybrid electric vehicle includes charging a main battery using a second motor connected to the engine.

2. The method according to claim 1, wherein the first condition is satisfied if the number of times the engine has stalled reaches a predetermined number of times during slip launch of the hybrid electric vehicle.

3. The method according to claim 1, wherein execution of the slip launch of the hybrid electric vehicle includes controlling a transmission in a slip state.

4. The method according to claim 1, wherein launch of the hybrid electric vehicle using power of the first motor includes controlling a transmission in a lock-up state.

5. The method according to claim 1, further comprising starting the engine to switch operation mode of the vehicle to a hybrid electric vehicle (HEV) mode, if a second condition is satisfied.

6. The method according to claim 5, wherein the second condition includes the revolutions per minute (RPM) of the engine reaching a designated value.

7. The method according to claim 5, further comprising decreasing torque of the first motor if a state of charge (SoC) of the main battery has a designated value or less under a condition that the second condition is not satisfied.

8. The method according to claim 1, wherein, if the first condition is not satisfied even if the engine has stalled, the method further comprises restarting the engine as long as the first condition is not satisfied.

9. The method according to claim 1, wherein launch of the hybrid electric vehicle using power of the first motor is executed if the SoC of the main battery has a designated value or more.

10. A non-transitory computer readable recording medium for recording a program to execute a method of controlling launch of a hybrid electric vehicle provided with an engine clutch disposed between a first motor and an engine, the method comprising:
    determining whether the engine clutch is in a lock-up state;
    maintaining running of the engine upon determining that the engine clutch is in the lock-up state;
    executing slip launch of the hybrid electric vehicle using power of the engine; and
    launching the hybrid electric vehicle using power of the first motor, if a first condition relating to the stalling of the engine is satisfied,
    wherein execution of the slip launch of the hybrid electric vehicle includes charging a main battery using a second motor connected to the engine.

11. A hybrid electric vehicle, comprising:
    a first controller including a first processor and configured to control a first motor;
    a second controller including a second processor and configured to control an engine;
    a third controller including a third processor and configured to control an engine clutch disposed between the first motor and the engine; and
    a fourth controller including a fourth processor and configured to determine whether the engine clutch is in a lock-up state based on information received from the third controller, to maintain running of the engine through control of the second controller so as to execute a slip launch of the hybrid electric vehicle using power of the engine upon determining that the engine clutch is in the lock-up state, and to control the first controller so as to launch the hybrid electric vehicle using power of the first motor if a first condition relating to the stalling of the engine is satisfied,
    wherein during the slip launch of the hybrid electric vehicle, the fourth controller controls the first controller so as to charge a main battery using a second motor connected to the engine.

12. The hybrid electric vehicle according to claim 11, wherein the first condition is satisfied if the number of times the engine has stalled reaches a predetermined number of times during slip launch of the hybrid electric vehicle.

13. The hybrid electric vehicle according to claim 11, wherein a transmission is controlled in a slip state during slip launch of the hybrid electric vehicle.

14. The hybrid electric vehicle according to claim 11, wherein a transmission is controlled in a lock-up state during launch of the hybrid electric vehicle using power of the first motor.

15. The hybrid electric vehicle according to claim 11, wherein the fourth controller starts the engine so as to switch operation mode of the vehicle to a hybrid electric vehicle (HEV) mode, if a second condition is satisfied.

16. The hybrid electric vehicle according to claim 15, wherein the second condition includes the revolutions per minute (RPM) of the engine reaching a designated value.

17. The hybrid electric vehicle according to claim 15, wherein, if a state of charge (SoC) of the main battery has a designated value or less under a condition that the second condition is not satisfied, the fourth controller controls the first controller so as to decrease torque of the first motor.

18. The hybrid electric vehicle according to claim 11, wherein, if the first condition is not satisfied even if the engine has stalled, the fourth controller controls the second controller so as to restart the engine as long as the first condition is not satisfied.

19. The hybrid electric vehicle according to claim 11, wherein the fourth controller controls the first controller so as to execute launch of the hybrid electric vehicle using power of the first motor if the SoC of the main battery has a designated value or more.

\* \* \* \* \*